I. Z. GARFIELD.
MACHINE FOR MEASURING AND COMPRESSING POWDERS.
APPLICATION FILED APR. 22, 1915.

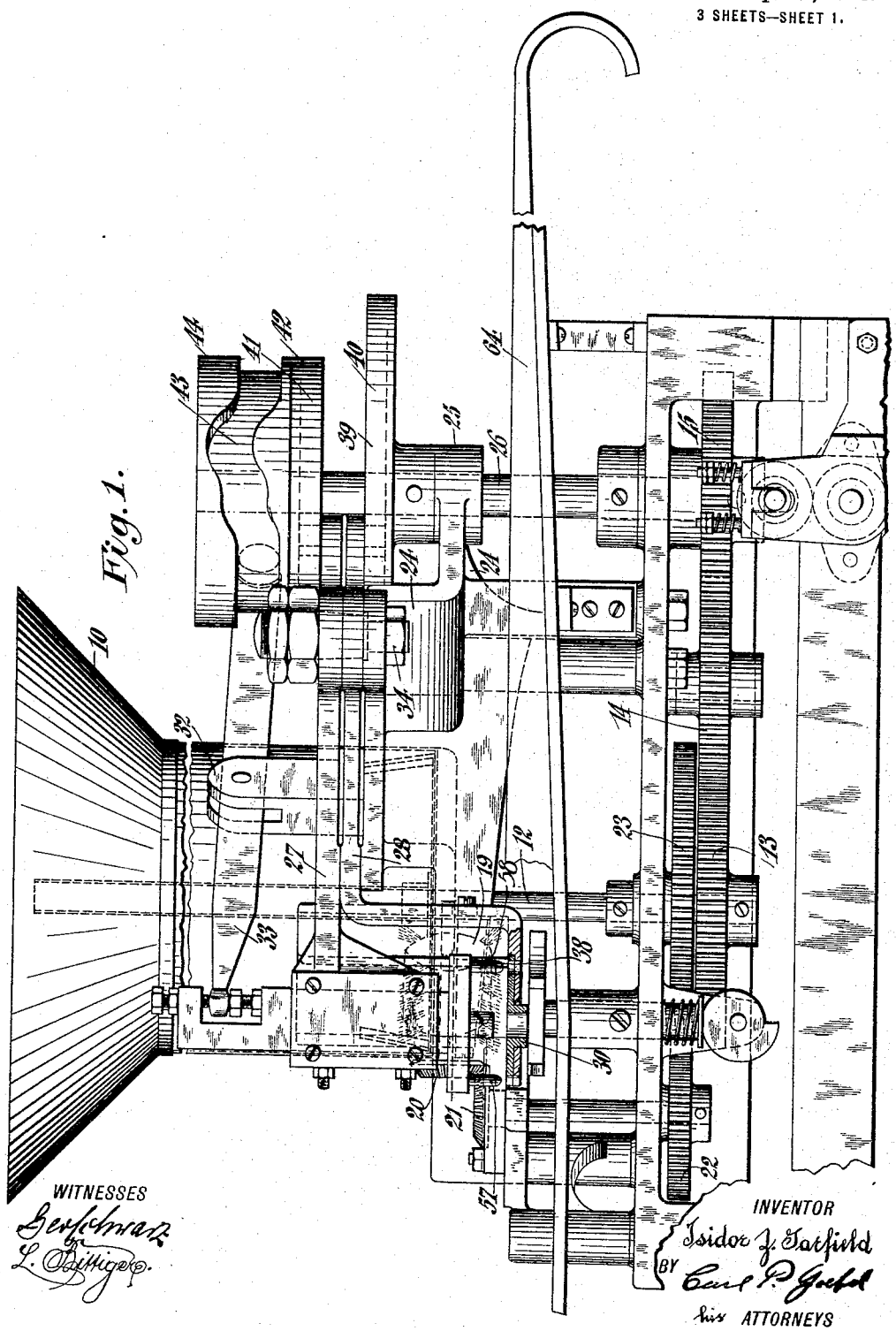

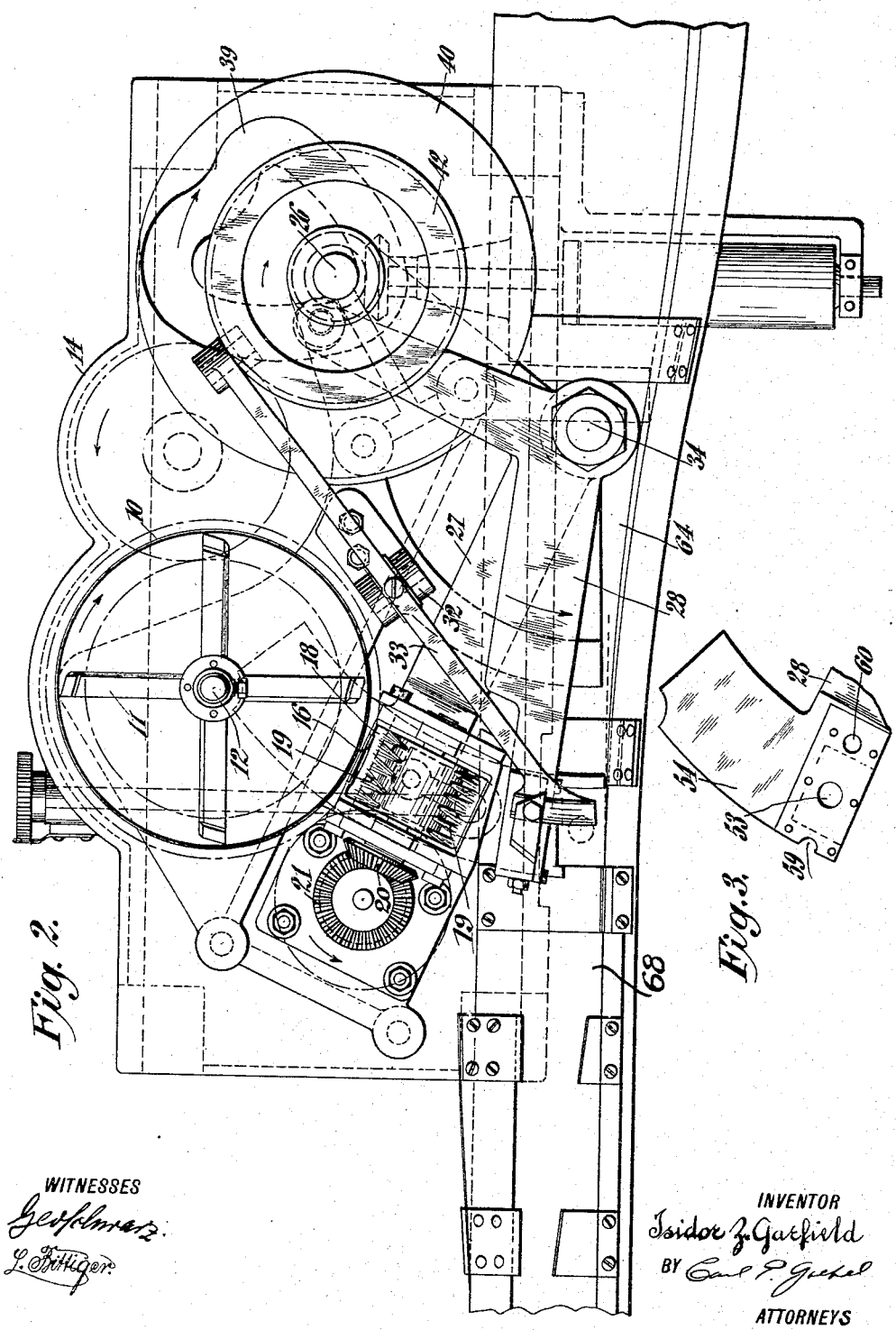

1,177,855.

Patented Apr. 4, 1916.
3 SHEETS—SHEET 3.

Witnesses:

Inventor
Isidor Z. Garfield
By his Attorney

UNITED STATES PATENT OFFICE.

ISIDOR Z. GARFIELD, OF NEW YORK, N. Y.

MACHINE FOR MEASURING AND COMPRESSING POWDERS.

1,177,855.  Specification of Letters Patent.  Patented Apr. 4, 1916.

Application filed April 22, 1915. Serial No. 23,114.

*To all whom it may concern:*

Be it known that I, ISIDOR Z. GARFIELD, a citizen of the United States of America, and a resident of New York, in the borough of Manhattan, county and State of New York, have invented certain new and useful Improvements in Machines for Measuring and Compressing Powders, of which the following is a specification.

The object of this invention is to provide a comparatively simple and compact machine for compressing measured quantities of medicinal powders, such as sedlitz powders, Rochelle salts, etc., into cakes of any desired shape, round, square, oblong or other form, such cakes being utilized by being wrapped thereafter in paper wrappers for sale and use, the wrapping, however, constituting no part of the present invention, which is limited to compressing the powders into cakes of the desired shape and strength for the purpose mentioned. This result is accomplished by providing in connection with a feed-hopper, a brush-box containing a rotary brush, which forces the powder through an aperture in the brush-box into a reciprocating die in which the powder is compressed, and from which the cake is discharged by means of a coöperating plunger.

Figure 4:
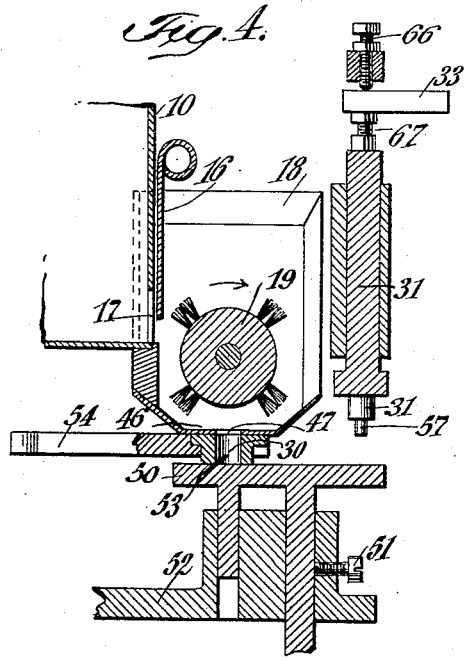
Figure 5:
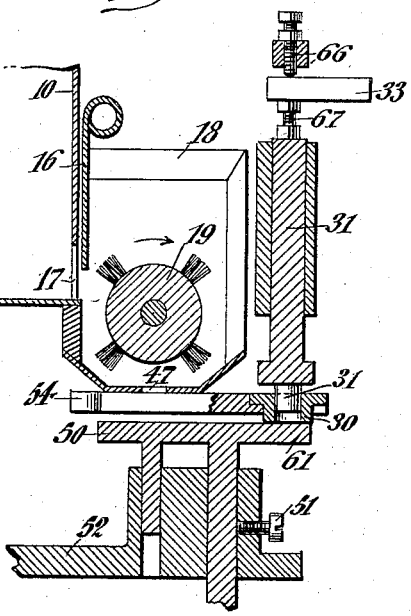

In the accompanying drawings, Figure 1 is a side view of a machine embodying the invention; Fig. 2 is a plan of the same; Fig. 3 is a detail of the die; Fig. 4 shows the die in position ready to be filled with the powder to be compressed; Fig. 5 shows the die advanced under the plunger; and Fig. 6 shows both the die and the plunger advanced to a further position, and the plunger filling the die, having expelled the compressed cake therefrom.

Similar reference characters indicate corresponding parts throughout the figures.

The hopper 10 (Fig. 1) is provided with a rotary agitator 11 mounted on a vertical shaft 12, and which is rotated from below by suitable gear and pinion connections 13, 14 and 15, the latter being connected with the driving shaft of the machine, which is not shown. At its lower portion the hopper 10 is provided with a vertically sliding gate 16, by which the quantity of powder to be admitted through the opening 17 of the hopper into the brush-box 18 is controlled. The brush-box is supported at the lower end of the feed-hopper and has within the same, mounted on a horizontal axis, a rotary brush 19 which is continuously rotated in the direction of the arrow shown in Figs. 4, 5 and 6, by means of suitable gear and pinion transmissions 20, 21, 22 and 23, gear-wheel 23 being arranged upon the shaft 12 of the main agitator. A bracket 24 rises from the frame of the machine, and has a bearing 25 for the cam shaft 26, hereinafter referred to. Said bracket 24 supports also two cam levers 27, 28, respectively. The lower cam lever 28 is bent downwardly at its outer end and carries the die 30. The upper cam lever 27 carries the plunger 31 and also pivoted to a post 32, the plunger operating cam lever 33. Both cam levers 27 and 28 are pivoted at 34 to the bracket 24. At its inner end, cam lever 28 engages by suitable anti-friction rollers, the cam groove 39 of the cam 40 on the cam shaft 26. Likewise, the cam lever 27 at its inner end engages a cam groove 41 of the cam 42, secured to the cam shaft 26. The plunger lever 33 is provided at its rear end with an anti-friction roller, which enters a groove 43 of a cam 44, also mounted on the cam shaft 26. The cam grooves of the cams 39 and 41 are so arranged as to give the cam levers 27 and 28 a horizontal movement, while the cam groove 43 is vertically undulatory so as to impart vertical motion to the plunger lever. Below the brush-box and below the die, is located a guide-plate 50, which by means of the set screw 51 is adjusted vertically in the frame 52 of the machine, so as to guide the die 30 in close contact with the bottom 46 of the brush-box 18. The die has a vertical opening 53, extending entirely through the same, and when in retracted position, registers with a delivery opening 47 in the bottom of the brush-box, as seen in Fig. 4. The die is supported by the outer end of a slide 54, which when the die is advanced serves to close the delivery opening, as seen in Fig. 5. For guiding the plunger in its descent into the die, the plunger is provided with two guide-pins 57, 58, which enter corresponding openings 59, 60 in the die.

Figure 6:
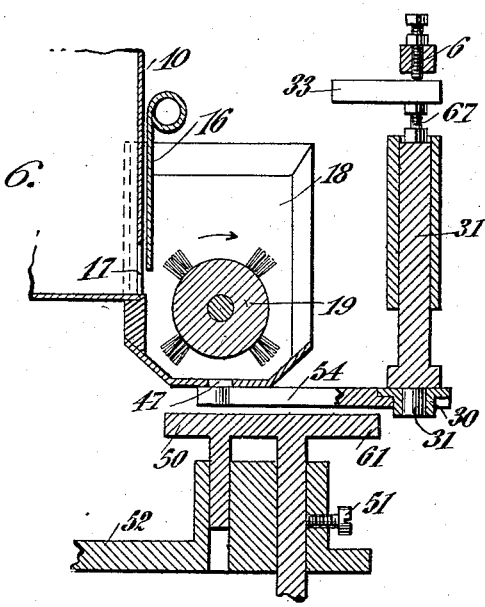

The successive operations of the machine are illustrated in Figs. 4, 5 and 6. In Fig. 4, the die is in position for filling, that is to say, the die is located opposite the delivery opening 47, and the bottom of the die is closed by the guide plate 50. A quantity having been swept by the brush 18 through the opening 47 into the die, the die is advanced by means of the cam lever 28 into the position shown in Fig. 5, in which the die is located at the forward end of the guide plate, which thereby forms a compression plate 61. The plunger 31 is now moved downwardly by its lever 33 into the die, and thereby compresses the powder therein, the position of the plunger at the termination of the compression being indicated in Fig. 5. Both the die and the plunger are now given, by means of the cam lever 27, a further outward movement, which carries the die beyond the compression plate 61. The plunger is also given a further downward movement by its lever arm 33, so that it completely fills the die, as shown in Fig. 6, thereby expelling the cake of powdered material. The cake falls upon a strip of paper wrapper 68, which is intermittently fed forwardly along the wrapper-guide 64, whereupon the cams lift the plunger and return the die and plunger to their original positions, so that the die is ready to be again filled with the powder and the operation of compressing repeated. The thus measured quantity of powder is again carried out in the manner described, all the operations being continuous, and entirely automatic.

The compression of the powder into a cake is only sufficient to hold the cake intact, while the same is measured and delivered to the paper, the same breaking up into powder again during the wrapping process. The improvements might also be advantageously used in the measuring and wrapping of paints, dyes and other forms of powders.

The machine described is simple and effective in operation, compresses the powder with minimum waste thereof, produces cakes always of uniform density, which may be determined and adjusted by means of adjusting screws 66, 67, at the upper end of the plunger, and operates rapidly and with an economy of power, secures the reliable compression of the powder into cakes of the desired shape and size.

I have shown one embodiment of the invention, but it is obvious that changes may be made therein without departing from the spirit of the same as set forth in the claims.

I claim:—

1. A machine for measuring and compressing powders comprising a feed-hopper, a brush-box at the outgoing end of the frame, a brush in said box, means for intermittently rotating the same against the stream of powder entering the brush-box, said box having a delivery-opening, a guide-plate below the brush-box, a die supported on and guided by the guide-plate in contact with the brush-box, means for closing the delivery-opening of the brush-box when the die is moved away from the same, said guide-plate extending beyond the brush-box to form a compression block, a plunger located beyond the brush-box, means for moving the die into the path of the plunger, means for actuating the plunger for a part of its travel for compressing the powder in the die, means for moving the die and the plunger while engaged beyond the edge of the compression plate, and means for moving the plunger the remainder of its travel for expulsion of the cake from the die.

2. A machine for measuring and compressing powders comprising a feed-hopper, a brush-box at the outgoing end of the same, a brush in said box, means for intermittently rotating the same against the stream of powder entering the brush-box, said box having a delivery-opening, a guide-plate below the brush-box and means for adjusting the guide-plate toward and from the bottom of the brush-box, a die supported on and guided by the guide-plate in contact with the brush-box, said guide-plate extending beyond the brush-box to form a compression block, a plunger located beyond the brush-box, means for moving the die into the path of the plunger, means for actuating the plunger for a part of its travel for compressing the powder in the die, means for moving the die and the plunger while engaged beyond the edge of the compression plate, and means for moving the plunger the remainder of its travel for expulsion of the cake from the die.

3. A machine for measuring and compressing powders comprising a feed-hopper, a brush-box at the outgoing end of the frame, a brush in said box, means for intermittently rotating the same against the stream of powder entering the brush-box, said box having a delivery-opening, a guide-plate below the brush-box, a die supported on and guided by the guide-plate in contact with the brush-box, a slide supporting the die and adapted to close the delivery-opening of the brush-box when the die is moved away from the same, said guide-plate extending beyond the brush-box to form a compression block, a plunger located beyond the brush-box, means for moving the die into the path of the plunger, means for actuating the plunger for a part of its travel for compressing the powder in the die, means for moving the die and the plunger while engaged beyond the edge of the compression plate, and means for moving the plunger the remainder of its travel for expulsion of the cake from the die.

In testimony that I claim the foregoing as my invention, I have signed my name in presence of two subscribing witnesses.

ISIDOR Z. GARFIELD.

Witnesses:
Jos. Bisbano,
D. Lewis Mettern.

Copies of this patent may be obtained for five cents each, by addressing the "Commissioner of Patents, Washington, D. C."